(12) United States Patent
Iritani et al.

(10) Patent No.: US 6,918,261 B2
(45) Date of Patent: Jul. 19, 2005

(54) ELECTRIC COMPRESSOR WITH A MOTOR, AN ELECTRIC CIRCUIT AND A PROTECTIVE CONTROL MEANS THEREFOR

(75) Inventors: Kunio Iritani, Anjo (JP); Katsuyoshi Toriyama, Hazu-gun (JP)

(73) Assignee: DENSO Corporation, Kariya (JP)

( * ) Notice: Subject to any disclaimer, the term of this patent is extended or adjusted under 35 U.S.C. 154(b) by 42 days.

(21) Appl. No.: 10/459,198

(22) Filed: Jun. 11, 2003

(65) Prior Publication Data

US 2003/0230101 A1 Dec. 18, 2003

(30) Foreign Application Priority Data

Jun. 12, 2002 (JP) .................................... 2002-171499
Apr. 10, 2003 (JP) .................................... 2003-106702

(51) Int. Cl.[7] ............................................. F25B 49/02
(52) U.S. Cl. ....................... 62/228.4; 62/126; 62/505; 417/280
(58) Field of Search ............................. 62/228.1, 228.3, 62/228.4, 228.5, 259.2, 125, 126, 127, 129, 130, 505, 113, 513; 165/80.4; 417/13, 14, 32, 42, 44.1, 44.11, 279, 280, 292

(56) References Cited

U.S. PATENT DOCUMENTS

| | | | |
|---|---|---|---|
| 5,651,260 A | * | 7/1997 | Goto et al. .................... 62/126 |
| 6,041,609 A | | 3/2000 | Hornsleth et al. |
| 6,116,040 A | * | 9/2000 | Stark .......................... 62/259.2 |
| 6,341,496 B1 | * | 1/2002 | Kettner et al. ................ 62/225 |
| 6,434,960 B1 | * | 8/2002 | Rousseau .................... 62/228.4 |
| 6,523,361 B2 | * | 2/2003 | Higashiyama ............. 62/228.4 |

* cited by examiner

*Primary Examiner*—Harry B. Tanner
(74) *Attorney, Agent, or Firm*—Harness, Dickey & Pierce, PLC

(57) ABSTRACT

In an electric compressor integrally comprising a compression mechanism, a motor and an electric circuit (inverter) for driving the motor, the electric circuit is protected from thermal damage.

When an actual number of revolutions is not more than a fixed number of revolutions and the temperature of an electric circuit 13 exceeds a fixed temperature, the temperature Tm of a motor 12 and the temperature Ti of the electric circuit 13 are lowered by increasing the number of revolutions of the motor, and when the actual number of revolutions is more than a fixed number of revolutions and the temperature of the electric circuit 13 exceeds a fixed temperature, the temperature Tm of the motor 12 and the temperature Ti of the electric circuit 13 are lowered by decreasing the number of revolutions of the motor.

8 Claims, 8 Drawing Sheets

FIRST PROTECTIVE CONTROL OPERATION

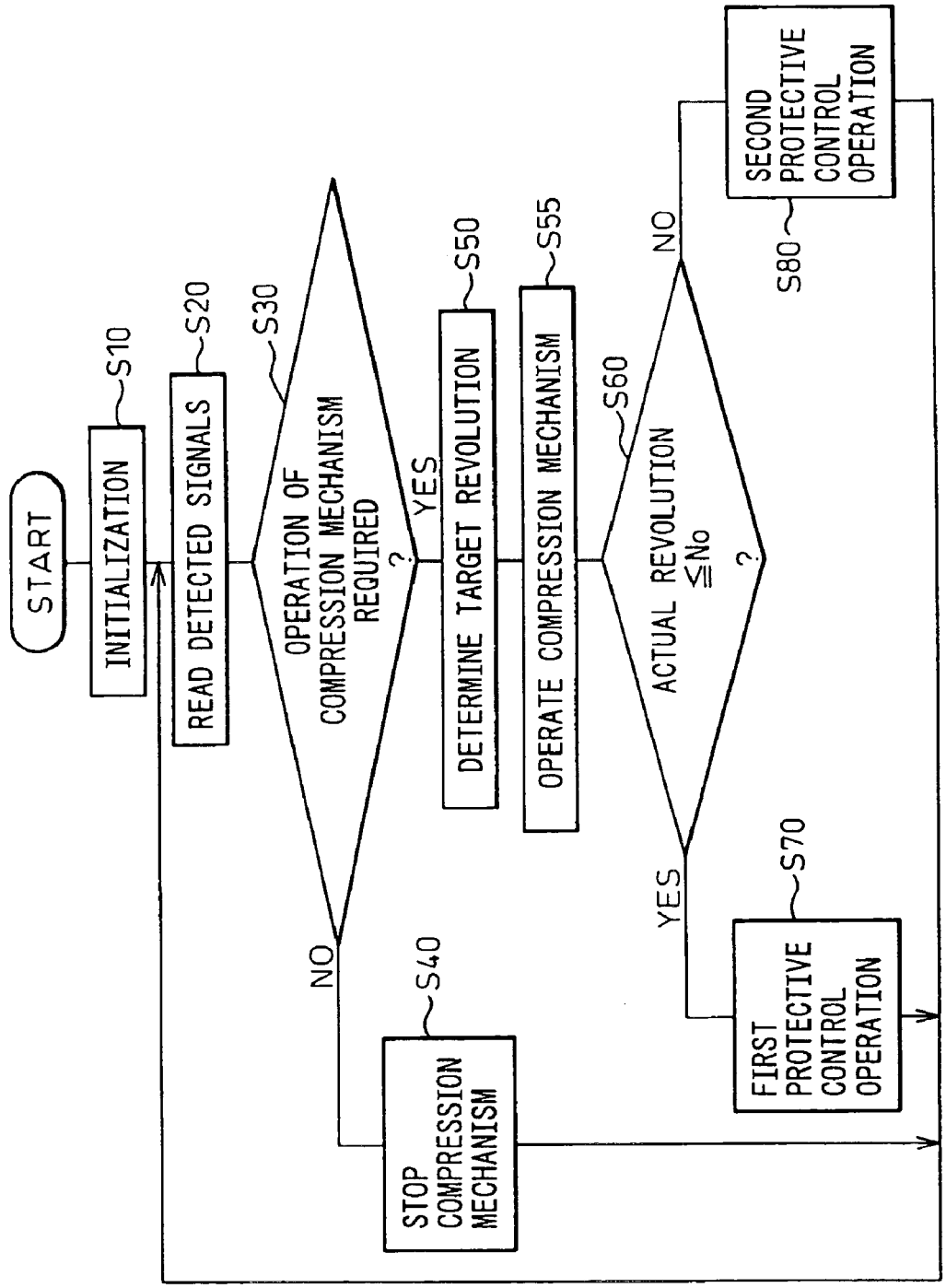

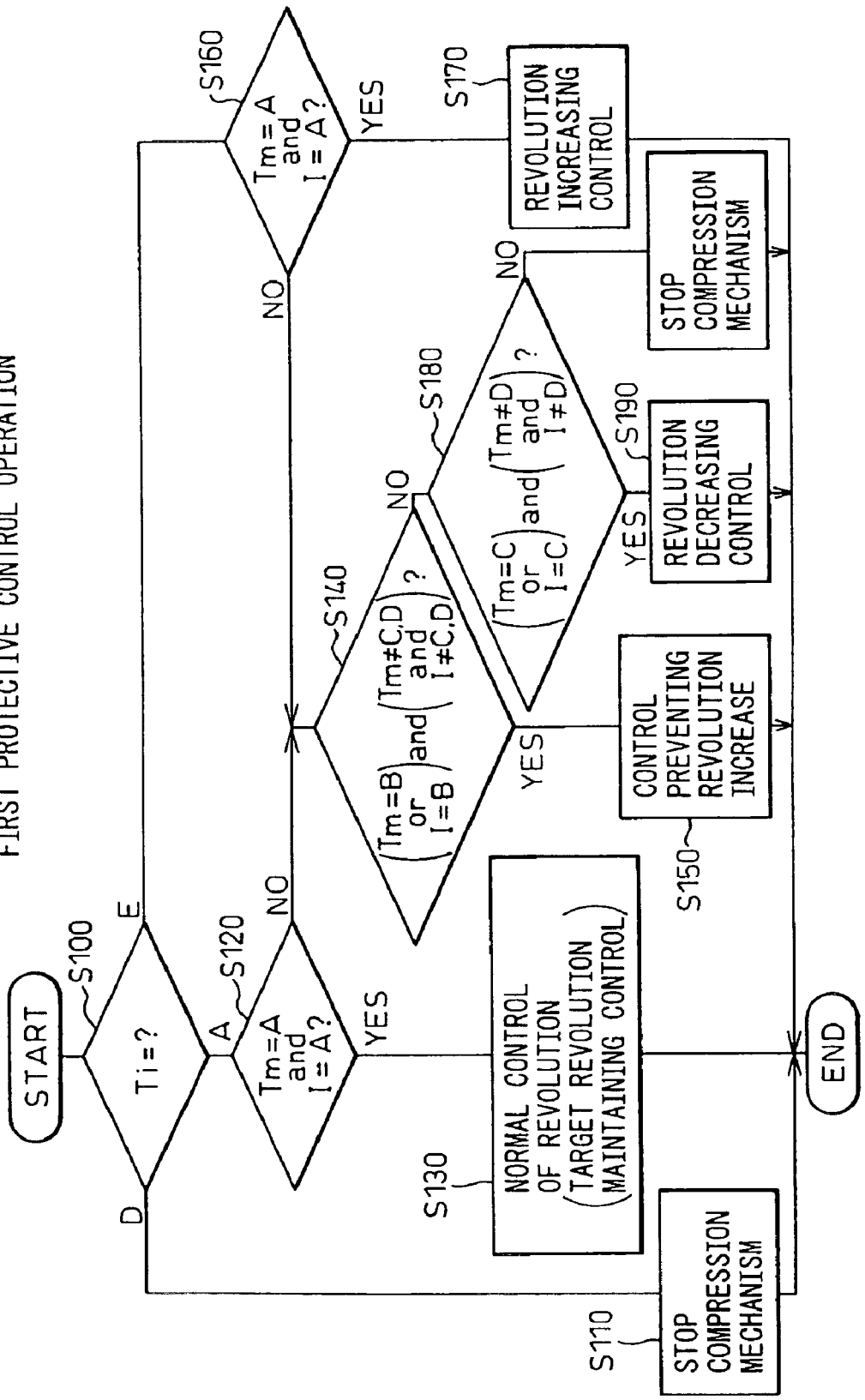

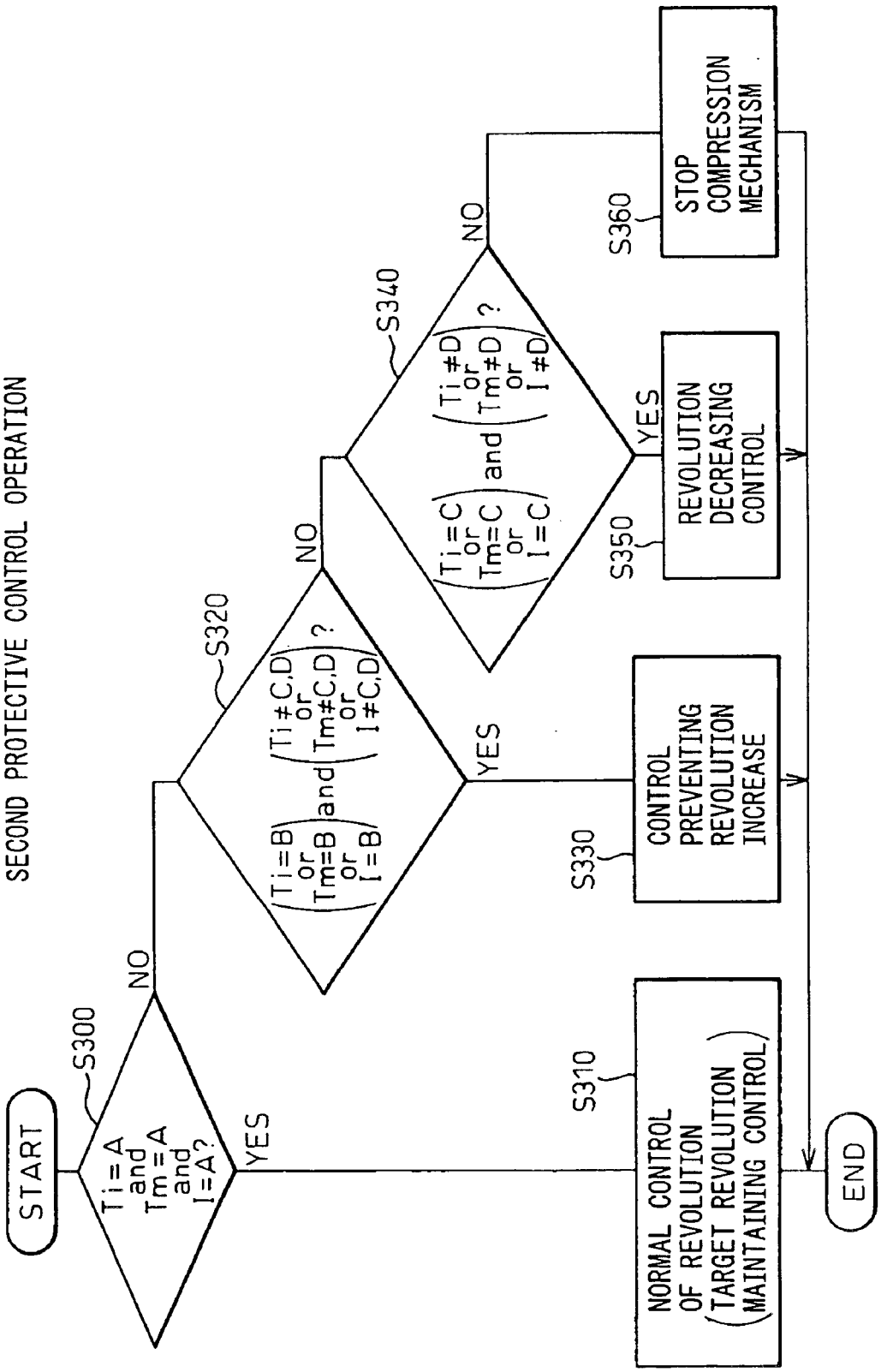

ELECTRIC COMPRESSOR WITH A MOTOR, AN ELECTRIC CIRCUIT AND A PROTECTIVE CONTROL MEANS THEREFOR

BACKGROUND OF THE INVENTION

1. Field of the Invention

The present invention relates to an electric compressor integrally comprising a compression mechanism, a motor that drives the compression mechanism, and an electric circuit for driving the motor, and is effective when used as an electric compressor for a vapor compression type refrigerator.

2. Description of the Related Art

An electric compressor, in which a compression mechanism, a motor and an electric circuit are provided separately, usually protects the electric circuit from thermal damage by controlling the number of revolutions of the motor, that is, the number of revolutions of the compression mechanism based on the output of the electric circuit and the temperature of ambient atmosphere.

For an electric compressor, however, in which a compression mechanism, a motor that drives the compression mechanism, and an electric circuit for driving the motor are integrally provided, it is difficult to protect the electric circuit from thermal damage in a manner similar to a conventional one.

The present invention has been developed with the above-mentioned problem being taken into consideration, and the object is to protect an electric circuit from thermal damage in a manner proper to an electric compressor in which a compression mechanism, a motor that drives the compression mechanism, and an electric circuit for driving the motor are integrally provided.

SUMMARY OF THE INVENTION

In order to achieve the above-mentioned object, according to a first aspect of the present invention, an electric compressor integrally comprises a compression mechanism (11) that draws in and compresses a refrigerant, an electric motor (12) that drives the compression mechanism (11), and an electric circuit (13) that drives the motor (12). The electric compressor comprises a protective control means for increasing the number of revolutions of the compression mechanism (11) when the temperature of the electric circuit (13) exceeds a fixed temperature.

When the number of revolutions is relatively small, the cooling effect by the refrigerant is insufficient for the amount of heat generated by the electric circuit (13) and the motor (12) and, therefore, as the number of revolutions increases, the cooling effect by the refrigerant increases but, conversely, when the number of revolutions is relatively large, the amount of heat generated by the electric circuit (13) and the motor (12) surpasses the cooling effect by the refrigerant and, therefore, as the number of revolutions increases, the temperatures of the electric circuit (13) and the motor (12) increase.

If, therefore, there is provided with a protective control means, as in the present invention, for increasing the number of revolutions of the compression mechanism (11) when the temperature of the electric circuit (13) exceeds a fixed temperature, it is possible to effectively protect the motor (12) and the electric circuit (13) from thermal damage because the temperatures of the motor (12) and the electric circuit (13) can be lowered by increasing the number of revolutions of the compression mechanism (11).

According to a second aspect of the present invention, an electric compressor integrally comprises a compression mechanism (11) that draws in and compresses a refrigerant, an electric motor (12) that drives the compression mechanism (11), and an electric circuit (13) that drives the motor (12). The electric compressor comprises a protective control means for increasing the number of revolutions of the compression mechanism (11) when the actual number of revolutions of the compression mechanism (11) is not more than a fixed number of revolutions thereof and the temperature of the electric circuit (13) exceeds a fixed temperature.

According to a third aspect of the present invention, an electric compressor comprises a second protective control means for decreasing the number of revolutions of the compression mechanism (11) when the actual number of revolutions thereof is more than a fixed number of revolutions thereof and the temperature of an electric circuit (13) exceeds a fixed temperature.

According to a fourth aspect of the present invention, the electric circuit (13) is cooled by the refrigerant.

According to a fifth aspect of the present invention, an electric compressor comprises a fixed revolution determining means for determining a fixed number of revolutions based on at least one of the temperature of the ambient atmosphere and the discharge pressure (or the high pressure).

According to a sixth aspect of the present invention, an electric compressor comprises a limiter means for preventing the number of revolutions of the compression mechanism (11) from reaching and exceeding a fixed upper limit number of revolutions thereof when the protective control means increases the number of revolutions of the compression mechanism (11).

Due to this, it is possible to effectively protect the motor (12) and the electric circuit (13) from thermal damage.

According to a seventh aspect of the present invention, an electric compressor comprises an upper limit revolution determining means for determining an upper limit number of revolutions based on at least one of the temperature of ambient atmosphere and the discharge pressure (or the high pressure).

The reference numbers, in the brackets, of the means described above are examples showing the relationship of correspondence with the concrete means in the embodiments to be described later.

The present invention may be more fully understood from the description of the preferred embodiments of the invention set forth below, together with the accompanying drawings.

BRIEF DESCRIPTION OF THE DRAWINGS

In the drawings:

FIG. 2 is a flow chart showing the control of an air conditioner according to a first embodiment of the present invention.

FIG. 3 is a flow chart showing the control of an air conditioner according to the first embodiment of the present invention.

FIG. 5 is a flow chart showing the control of an air conditioner according to the first embodiment of the present invention.

DESCRIPTION OF THE PREFERRED EMBODIMENTS (First Embodiment)

Figure 1:
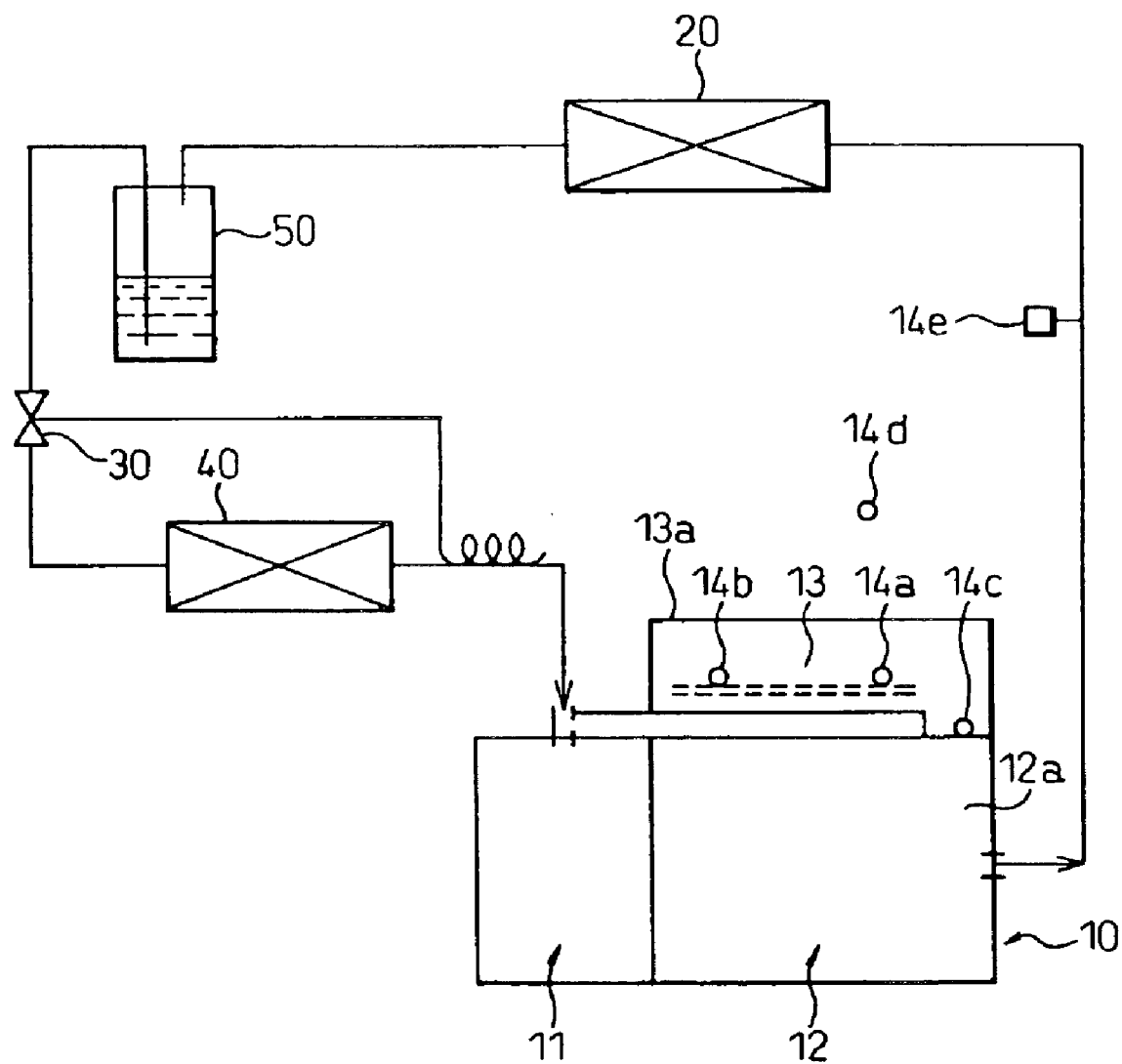
FIG. 1 is an exemplary diagram of an air conditioner according to an embodiment of the present invention.

The present embodiment is one in which the present invention is applied to an electric compressor for a vapor compression type refrigerator for a vehicle (air conditioner for a vehicle) and FIG. 1 is an exemplary diagram of a vapor compression type refrigerator using an electric compressor 10 according to the present embodiment.

As widely known, a vapor compression type refrigerator comprises a radiator 20 that cools a compressed high pressure and high temperature refrigerant by radiating heat, a pressure reducing device 30 that reduces the pressure of the cooled high pressure refrigerant, an evaporator 40 that acts as a cooling apparatus by vaporizing the pressure-reduced low pressure refrigerant, a gas-liquid separator 50 that stores the excessive refrigerant in the refrigerator as a liquid phase refrigerant, and so on.

In the present embodiment, a thermostatic expansion valve, which controls the throttle opening so that the superheated refrigerant temperature at the refrigerant outlet of the evaporator 40 is equal to a fixed value, is adopted as the pressure reducing device 30 and a receiver installed at the refrigerant inlet of the pressure reducing device 30 is adopted as the gas-liquid separator 50.

The electric compressor 10 comprises a scroll type compression mechanism 11 that draws in and compresses a refrigerant, a DC brush-less type motor 12 that drives the compression mechanism 11, an electric circuit 13 for driving a motor, including components such as an inverter circuit to drive the motor 12, and so on, and the compression mechanism 11 and the motor 12 are coaxially aligned, in series with each other and are integrated with each other.

A casing 13a that contains the electric circuit 13 is bolted to the external surface of a substantially cylindrical motor house 12a and integrated with the compression mechanism 11 and the motor 12. In the present embodiment, the containers such as the motor housing 12a and the casing 13a are all made of aluminum alloy.

The motor housing 12a contains a rotor, a stator, and so on, and the motor, that is, a rotating electric motor, comprises a rotor, a stator, the motor housing 12a, etc.

In the electric compressor 10, the electric circuit 13 is bolted and fixed to a crankcase of a propulsion engine so that the electric circuit 13 is located oppositely to the propulsion engine with the motor 12 being sandwiched thereby. In the present embodiment, although the electric circuit 13 is bolted and fixed to the crankcase of the propulsion engine so that the electric circuit 13 is located oppositely to the propulsion engine with the motor 12 being sandwiched thereby, the present embodiment is not limited to this, and, for example, the electric circuit 13 may be located at the upper side of the motor 12.

Moreover, although the electric compressor 10 is attached to the crankcase in this embodiment, it may be attached to the vehicle body for an electric or hybrid vehicle, the drive source of which is an electric motor.

In the present embodiment, the refrigerant, which has flowed out of the evaporator 40 and has been drawn in by the electric compressor 10, is first drawn in and compressed by the compression mechanism 11 after it cools the electric circuit 13, and then it flows through the inside of the motor housing 12a, cools the motor 12, and flows into the radiator 20.

The electric circuit 13 is provided with a temperature sensor 14a that detects the temperature Ti of the electric circuit 13, a current sensor 14b that detects an output current value (inverter current) output from the electric circuit 13 to the motor 12, and a motor temperature sensor 14c that detects the temperature of the motor 12, and an electronic control unit (not shown) controls the electric compressor 10, that is, the electric circuit 13 based on the desired room temperature and the like set and input by the driver in addition to the detected signals of air condition sensors, such as an inside air temperature sensor, an outside air temperature sensor 14d and a sunshine sensor (partly shown), the temperature sensor 14a, the current sensor 14b, the motor temperature sensor 14c, and a discharge pressure (high pressure) sensor 14e.

Next, the method for controlling the electric compressor 10 is described below.

When the start switch (automatic switch for an automatic air conditioner) of an air conditioner is turned on, the electronic control unit initializes the control parameters (S10) and, at the same time, reads the detected signals of the temperature sensor 14a, the current sensor 14b, the motor temperature sensor 14c and the air conditioner sensors, and the input signal of the desired room temperature, etc., as shown in FIG. 2 (S20).

Next, the electronic control unit judges whether it is necessary to operate the compression mechanism 11 based on the detected signals of the air condition sensors, the desired room temperature, etc. (S30), and if it is not necessary to operate the compression mechanism 11, the motor 12 (compression mechanism 11) is stopped (S40). If the motor 12 is already stopped, the stopped state is maintained.

On the other hand, when it is necessary to operate the compression mechanism 11, the electronic control unit determines a target number of revolutions Nt based on the air conditioning load (S50) and operates the compression mechanism 11 (S55). Whether an actual number of revolutions Na is not more than a fixed number of revolutions No is judged (S60). The fixed number of revolutions No will be described later.

When the actual number of revolutions Na is not more than the fixed number of revolutions No, a first protective control operation, which will be described later, is performed (S70) and when the actual number of revolutions Na is more than the fixed number of revolutions No, a second protective control operation, which will be described later, is performed (S80).

Next, the first protective control operation is described below by reference to FIG. 3.

Figure 4A:
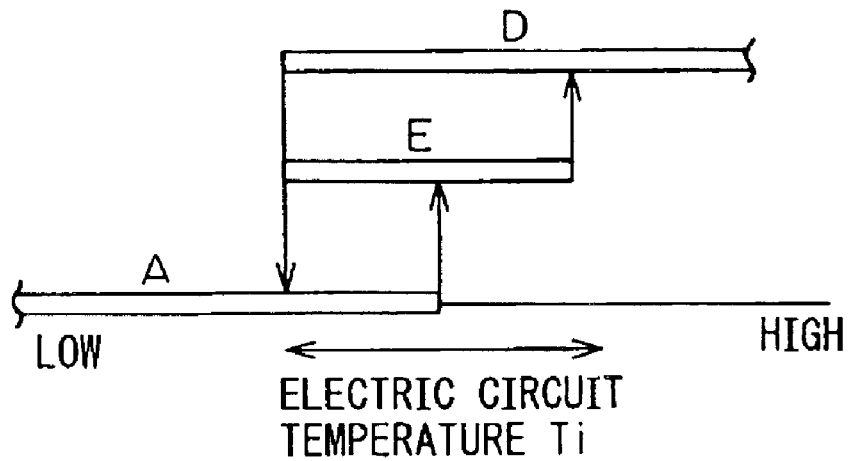
FIG. 4A shows a characteristic diagram for judging an area, to which electric circuit temperature Ti belongs, in a first protective control operation.

When the first protective control operation is performed, the electronic control unit first determines the temperature area to which the temperature Ti of the electric circuit 13 belongs by the map shown in FIG. 4A (S100). Then, when the temperature Ti belongs to the temperature area D, the motor 12 (compression mechanism 11) is stopped because the possibility that thermal damage to the electric circuit 13 will occur is strong. (S110).

Figure 4B:
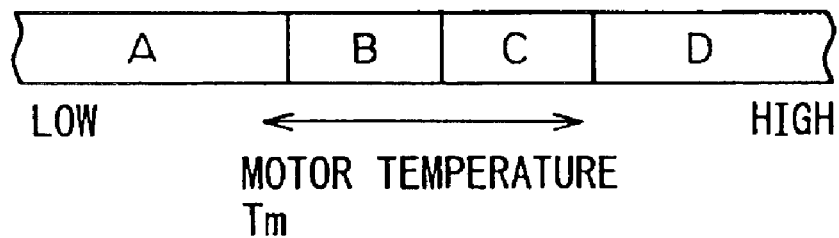
FIG. 4B shows a characteristic diagram for judging an area, to which motor temperature Tm belongs, in a first protective control operation.
Figure 4C:
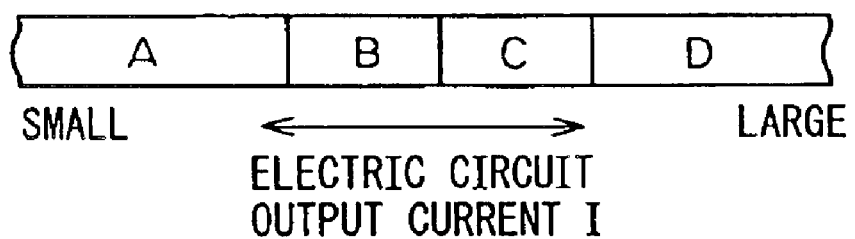
FIG. 4C shows a characteristic diagram for judging an area, to which electric circuit output current I belongs, in a first protective control operation.

When the temperature Ti belongs to the temperature area A, whether the temperature Tm of the motor 12 belongs to the temperature area A and the output current I belongs to the current area A is judged based on the maps shown in FIG. 4B and FIG. 4C (S120).

When the temperature Tm of the motor 12 belongs to the temperature area A and the output current I belongs to the current area A, it is judged that the operation belongs to a safety operation area where the thermal damage to the electric circuit 13 is unlikely to occur, and a target revolution control that controls the number of revolutions of the compression mechanism 11, that is, the motor 12, is performed based on the air conditioning load (S130).

The target revolution control represents a control to issue directive signals to the electric circuit 13 so that the actual number of revolutions of the motor becomes the target number of revolutions Nt.

On the other hand, when the temperature Tm of the motor 12 does not belong to the temperature area A or when the output current I does not belong to the current area A, that is, when "No" is the result of the judgment in S120, whether the temperature Tm of the motor 12 belongs to the temperature area B or the output current I belongs to the current area B is judged (S140), and when the temperature Tm of the motor 12 belongs to the temperature area B or when the output current I belongs to the current area B, the target of revolution control is performed in the range where the number of revolutions of the motor is not increased (S150 ).

When it is judged in S100 that the temperature Ti belongs to the temperature area E, whether the temperature Tm of the motor 12 belongs to the temperature area A and the output current I belongs to the current area A is judged (S160) and, when the temperature Tm of the motor 12 belongs to the temperature area A and the output current I belongs to the current are A, the temperature Tm of the motor 12 and the temperature Ti of the electric circuit 13 are lowered by increasing the number of revolutions of the motor (S170).

On the other hand, when the temperature Tm of the motor 12 does not belong to the temperature area A or when the output current I does not belong to the current area A, that is, when "No" is the result of the judgment in S160, whether the temperature Tm of the motor 12 belongs to the temperature area B or the output current I belongs to the current area B is judged (S140).

Then, when the temperature Tm of the motor 12 does not belong to the temperature area B and the output current I does not belong to the current area B, whether the temperature Tm of the motor 12 belongs to the temperature area C or the output current I belongs to the current area C is judged (S180), and when the temperature Tm of the motor 12 belongs to the temperature area C or when the output current I belongs to the current area C, the temperature of the motor 12 and the temperature of the electric circuit 13 are lowered by decreasing the number of revolutions of the motor (S190).

On the other hand, when the temperature Tm of the motor 12 does not belong to the temperature area C or when the output current I does not belong to the current area C, in other words, when the temperature Tm of the motor 12 belongs to the temperature area D or the output current I belongs to the current area D, that is, "No" is the result of the judgment in S180, the motor 12 is stopped.

Next, the second protective control operation is described below by reference to FIG. 5.

Figure 6A:
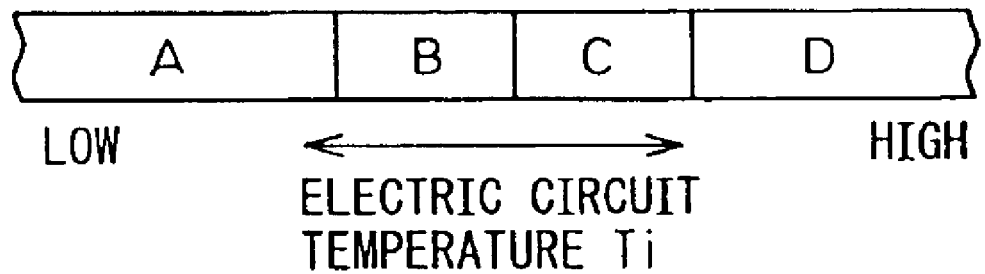
FIG. 6A shows a characteristic diagram for judging an area, to which electric circuit temperature Ti belongs, in a second protective control operation.
Figure 6B:
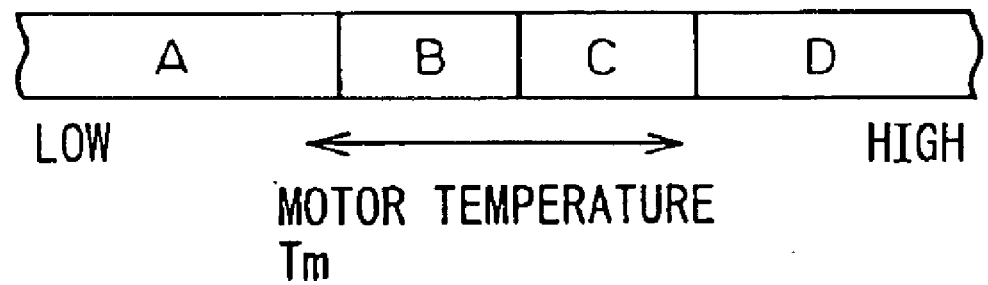
FIG. 6B shows a characteristic diagram for judging an area, to which motor temperature Tm belongs, in a second protective control operation.
Figure 6C:
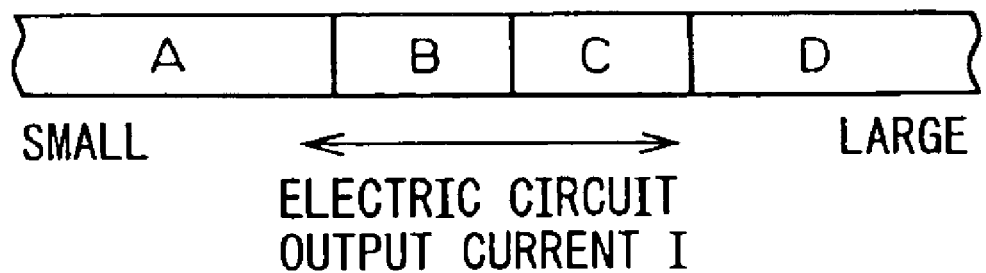
FIG. 6C shows a characteristic diagram for judging an area, to which electric circuit output current I belongs, in a second protective control operation.

When the second protective control operation is performed, the electronic control unit first judges whether the temperature Ti of the electric circuit 13 belongs to the temperature area A, the temperature Tm of the motor 12 belongs to the temperature area A, and the output current I belongs to the current area A based on the map shown in FIG. 6 (S300), and when the temperature Ti of the electric circuit 13 belongs to the temperature area A, the temperature Tm of the motor 12 belongs to the temperature area A, and the output current I belongs to the current area A, the target revolution control is performed (S310).

On the other hand, when the temperature Ti of the electric circuit 13 belongs to an area other than the temperature area A, or the temperature Tm of the motor 12 belongs to an area other than the temperature area A, or the output current I belongs to an area other than the current area A, that is, "No" is the result of the judgment in S300, whether the temperature Ti of the electric circuit 13 belongs to the temperature area B, or the temperature Tm of the motor 12 belongs to the temperature area B, or the output current I belongs to the current area B is judged (S320), and when at least one of the temperature Ti of the electric circuit 13, the temperature Tm of the motor 12, and the output current I belongs to the area B, the target revolution control is performed in the range where the number of revolutions of the motor is not increased (S330).

When the temperature Ti of the electric circuit 13, the temperature Tm of the motor 12 and nor the output current I do not belong to the area B, that is, "No" is the result of the judgment in S320, whether the temperature Ti of the electric circuit 13 belongs to the temperature area C, or the temperature Tm of the motor 12 belongs to the temperature area C, or the output current I belongs to the current area C is judged (S340), and when at least one of the temperature Ti of the electric circuit 13, the temperature Tm of the motor 12, and the output current I belongs to the area C, the temperature of the motor 12 and the temperature of the electric circuit 13 are lowered by decreasing the number of revolutions of the motor (S350).

On the other hand, when the temperature Ti of the electric circuit 13, the temperature Tm of the motor 12 and the output current I do not belong to the area C, that is, "No" is the result of the judgment in S340, the motor 12 is stopped (S360).

Next, the functions and effects of the present embodiment are described below.

Figure 7:
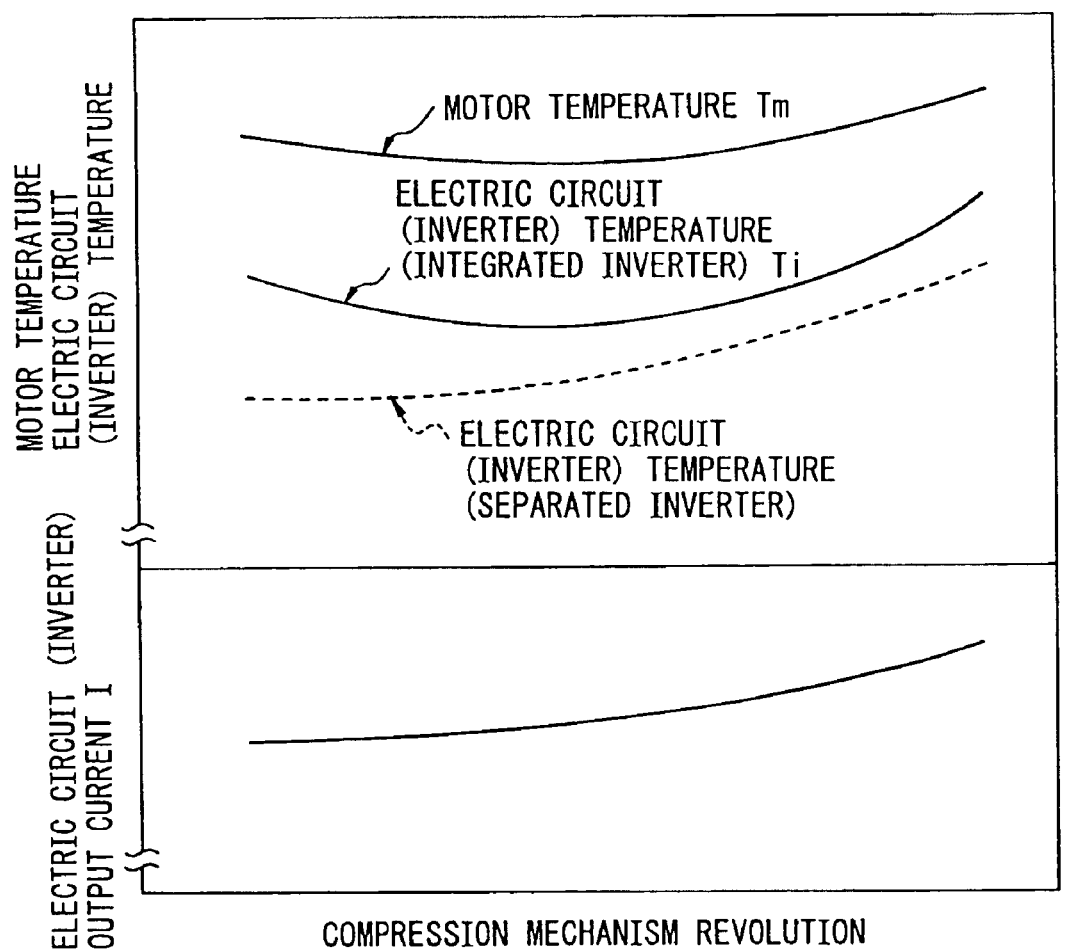
FIG. 7 is a graph showing a relationship between the number of revolutions of a compression mechanism and temperature, etc.
Figure 8:
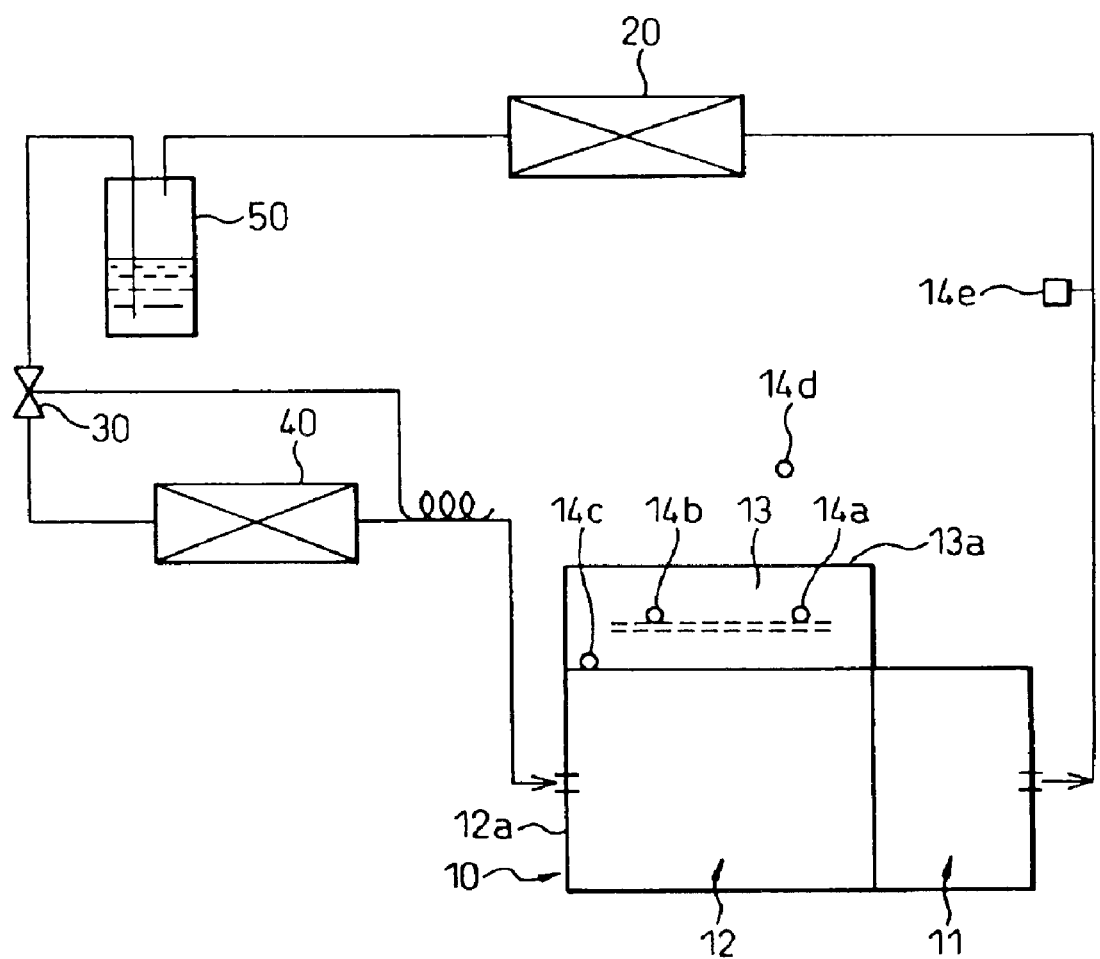
FIG. 8 is an exemplary diagram of an air conditioner according to a fifth embodiment of the present invention.

FIG. 7 shows the relationship among the temperature Ti of the electric circuit 13, the temperature Tm of the motor 12, and the output current I obtained by the test, and the relationship shows the characteristic such as that in the electric compressor 10 with which the electric circuit 13 is integrated, the temperature Ti of the electric circuit 13 and the temperature Tm of the motor 12 have an absolute minimum (local minimum) with respect to the number of revolutions of the compression mechanism 11, that is, the motor.

This is because when the number of the motor revolutions is relatively small, the cooling effect by the refrigerant is insufficient for the amount of heat generated by the electric circuit 13 and the motor 12 and, therefore, as the number of revolutions of the motor increases, the cooling effect by the refrigerant becomes stronger, but conversely, when the number of revolutions of the motor is relatively large, the amount of heat generated by the electric circuit 13 and the motor 12 surpasses the cooling effect by the refrigerant and, therefore, as the number of revolutions of the motor increases, the temperatures of the electric circuit 13 and the motor 12 increase.

Contrary to the above, in the present embodiment, when the target number of revolutions is not more than the fixed number of revolutions and the temperature of the electric circuit 13 exceeds the fixed temperature, the temperature Tm of the motor 12 and the temperature Ti of the electric circuit 13 are lowered by increasing the number of revolutions of the compression mechanism 11, that is, the number of revolutions of the motor (S170), therefore, the motor 12 and the electric circuit 13 can be effectively protected from thermal damage.

Moreover, as the motor 12 and the electric circuit 13 are protected from thermal damage, it is possible to reduce the number of times at which the motor 12 is stopped and, therefore, the motor 12 and the electric circuit 13 can be effectively protected from thermal damage without losing the quality of air conditioning considerably.

(Second Embodiment)

In the first embodiment, when it is judged that temperature Ti belongs to the temperature area E in S100 and when the temperature Tm of the motor 12 belongs to the temperature A and the output current I belongs to the current area A, the temperature Tm of the motor 12 and the temperature Ti of the electric circuit 13 are lowered by simply increasing the number of revolutions of the motor, but in the present embodiment, a limiter control step is included in the program stored in the electronic control unit, which prevents the number of revolutions of the motor from reaching and exceeding a fixed upper limit number of revolutions when the number of revolutions of the motor is increased.

Due to this, the motor 12 and the electric circuit 13 are protected from thermal damage and it is possible to further reduce the number of times at which the motor 12 is stopped and, therefore, the motor 12 and the electric circuit 13 can be effectively protected from thermal damage without losing the quality of air conditioning considerably.

(Third Embodiment)

The present embodiment is a variant of the second embodiment and, in concrete terms, in the present embodiment, an upper limit revolution determining step is included in the program stored in the electronic control unit, which determines an upper limit number of revolutions based on at least one of the temperature of ambient atmosphere and the discharge pressure (or the high pressure).

Due to this, the motor 12 and the electric circuit 13 are protected from thermal damage and it is possible to further reduce the number of times at which the motor 12 is stopped and, therefore, the motor 12 and the electric circuit 13 can be effectively protected from thermal damage without losing the quality of air conditioning considerably.

(Fourth Embodiment)

In the embodiments described above, the fixed number of revolutions No, which is the threshold that determines whether the first protective control operation is performed or the second protective control operation is performed, is a constant value, but in the present embodiment, a fixed revolution determining step is included in the program stored in the electronic control unit, which determines the fixed number of revolutions No based on at least one of the temperature of ambient atmosphere and the discharge pressure (or the high pressure).

Due to this, the motor 12 and the electric circuit 13 are protected from thermal damage and it is possible to further reduce the number of times at which the motor 12 is stopped and, therefore, the motor 12 and the electric circuit 13 can be effectively protected from thermal damage without losing the quality of air conditioning considerably.

(Fifth Embodiment)

In the embodiments described above, the electric circuit 13 is cooled by the drawn-in refrigerant and the motor 12 is cooled by the discharged refrigerant, but in the present embodiment, the motor 12 is cooled by the drawn-in refrigerant and the electric circuit 13 is cooled by the cooled motor housing.

(Other Embodiments)

In the embodiments described above, the temperature Tm of the motor 12 is detected by the motor temperature sensor 14c, but the present invention is not limited to this and the temperature Tm of the motor 12 may be detected using the temperature of the refrigerant flowing through the inside of the motor 12.

In the embodiments described above, the present invention is applied to an air conditioner for a vehicle, but the application of the present invention is not limited to this and it can be applied to others such as a refrigerator or the like.

In the embodiments described above, the scroll type compression mechanism 20 is adopted, but the present invention is not limited to this and a compression mechanism of another type, such as a rotary type or a rolling piston type, may be adopted.

Moreover, in the embodiments described above, the present invention is applied to a general electric compressor, but the application of the present invention is not limited to this and it is possible to apply to a compressor that can switch between the compression mechanism 11 being driven by driving sources other than the motor 12 via a power transmitting device such as a belt, and the compression mechanism 11 being driven by the motor 12.

While the invention has been described by reference to specific embodiments chosen for the purposes of illustration, it should be apparent that numerous modifications could be made thereto by those skilled in the art without departing from the basic concept and scope of the invention.

What is claimed is:

1. An electric compressor integrally comprising:
   a compression mechanism drawing in and compressing a refrigerant;
   an electric motor driving the compression mechanism; and
   an electric circuit driving the motor; wherein
   a protective control means is included, which increases the number of revolutions of the compression mechanism when the temperature of the electric circuit exceeds a fixed temperature.

2. An electric compressor integrally comprising:
   a compression mechanism drawing in and compressing a refrigerant;
   an electric motor driving the compression mechanism; and
   an electric circuit driving the motor; wherein a protective control means is included, which increases the number of revolutions of the compression mechanism when an actual number of revolutions of the compression mechanism is not more than a fixed number of revolutions thereof and the temperature of the electric circuit exceeds a fixed temperature.

3. An electric compressor, as set forth in claim 2, wherein a second protective control means is included, which decreases the number of revolutions of the compression mechanism when the actual number of revolutions thereof is more than a fixed number of revolutions thereof and the temperature of the electric circuit exceeds a fixed temperature.

4. An electric compressor, as set forth in claim 2, wherein the electric circuit is cooled by a refrigerant.

5. An electric compressor, as set forth in claim 3, wherein a fixed revolution determining means is included, which determines the fixed number of revolutions based on at least one of, the temperature of ambient atmosphere and the high side pressure.

6. An electric compressor, as set forth in claim 1, wherein a limiter means is included, which prevents the number of revolutions of the compression mechanism from reaching and exceeding a fixed upper limit number of revolutions thereof when the protective control means increases the number of revolutions of the compression mechanism.

7. An electric compressor, as set forth in claim 6, wherein an upper limit revolution determining means is included, which determines the upper limit number of revolutions based on at least one of the temperature of ambient atmosphere and the high side pressure.

8. An electric compressor, as set forth in claim 2, wherein a limiter means is included, which prevents the number of revolutions of the compression mechanism from reaching and exceeding a fixed upper limit number of revolutions thereof when the protective control means increases the number of revolutions of the compression mechanism.

* * * * *